United States Patent
Kershaw

(10) Patent No.: US 7,225,830 B1
(45) Date of Patent: Jun. 5, 2007

(54) FLUID CONTROL VALVE

(76) Inventor: Charles H. Kershaw, 10454 Norton, Houston, TX (US) 77043

( * ) Notice: Subject to any disclaimer, the term of this patent is extended or adjusted under 35 U.S.C. 154(b) by 32 days.

(21) Appl. No.: 11/054,506

(22) Filed: Feb. 9, 2005

(51) Int. Cl.
*F16K 17/04* (2006.01)

(52) U.S. Cl. .............................. 137/512.1; 137/516.25; 137/543.23

(58) Field of Classification Search ............ 137/512.1, 137/543.23, 540, 516.15, 516.23, 516.25; 251/28
See application file for complete search history.

(56) References Cited

U.S. PATENT DOCUMENTS

| | | | | |
|---|---|---|---|---|
| 1,003,819 | A | * | 9/1911 | Staples .................. 137/516.23 |
| 1,275,697 | A | * | 8/1918 | Joyce .................... 137/329.01 |
| 1,630,666 | A | * | 5/1927 | McEvoy, Jr. ............. 137/512.1 |
| 2,233,649 | A | * | 3/1941 | Stahl et al. ............ 137/543.13 |
| 2,983,281 | A | * | 5/1961 | Bynum .................. 137/543.23 |
| 3,083,723 | A | * | 4/1963 | Duchin ....................... 137/218 |
| 3,937,249 | A | * | 2/1976 | Suey ...................... 137/543.13 |
| 4,172,465 | A | | 10/1979 | Dashner |
| 4,354,520 | A | * | 10/1982 | Easley, Jr. ............. 137/543.23 |
| 4,436,111 | A | * | 3/1984 | Gold et al. ................. 137/498 |
| 4,613,111 | A | * | 9/1986 | Paquet et al. ................. 251/46 |
| 5,271,430 | A | | 12/1993 | Muruyama et al. |
| 6,220,272 | B1 | | 4/2001 | Tavor |
| 6,244,253 | B1 | | 6/2001 | Haeberer et al. |
| 6,263,913 | B1 | | 7/2001 | Kussel |

* cited by examiner

*Primary Examiner*—Eric Keasel
*Assistant Examiner*—Andrew J. Rost
(74) *Attorney, Agent, or Firm*—Kenneth A. Roddy

(57) ABSTRACT

A fluid control valve having a spring biased shuttle plunger member which opens or closes fluid flow through a plurality of radially spaced apart fluid passageways disposed between an upstream chamber and downstream chamber in the valve body responsive to a fluid pressure greater than the spring force and any differential pressure between the upstream and downstream chambers to prevent fluid from being supplied at a pressure higher than a desired operating pressure and prevent high dynamic differential pressures, such as a "water hammer" or explosive pressure. Alternatively, in a normally closed embodiment, pilot fluid at a pressure greater than the spring force and any differential pressure in the upstream chamber is utilized to open the valve, which is then closed by the spring force.

3 Claims, 3 Drawing Sheets

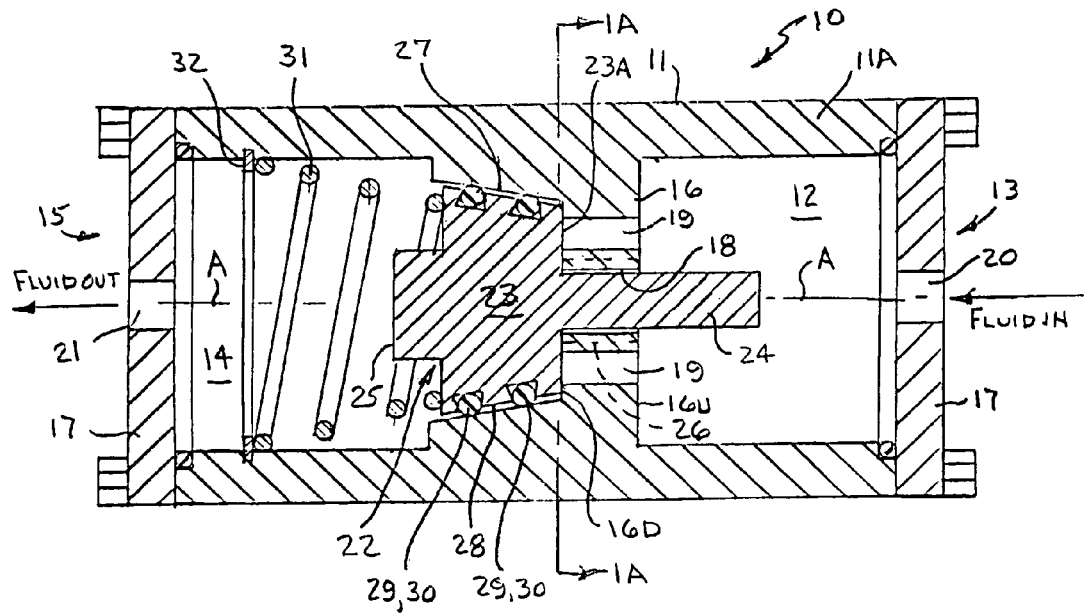
*Fig. 1*
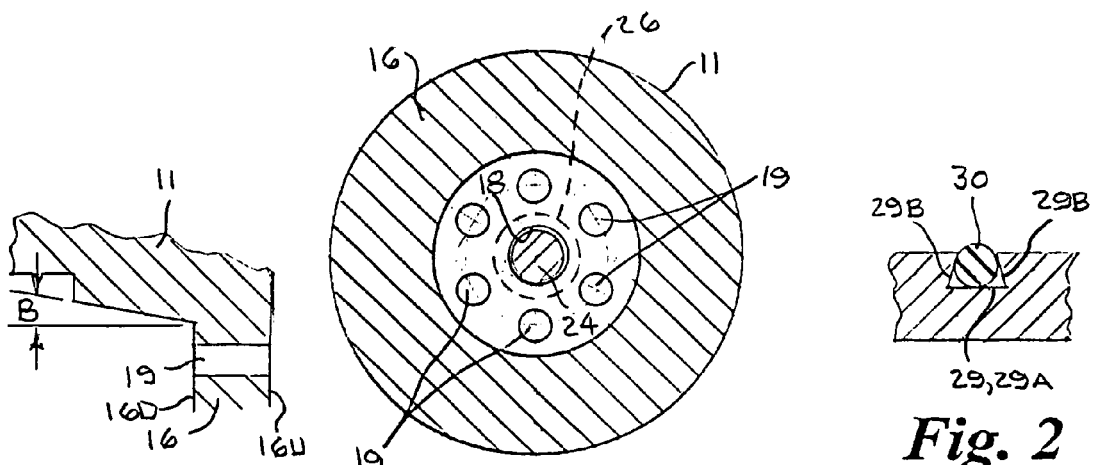
*Fig. 1B*  *Fig. 1A*  *Fig. 2*

FLUID CONTROL VALVE

BACKGROUND OF THE INVENTION

1. Field of the Invention

This invention relates generally to fluid control valves, and more particularly to a fluid control valve having a spring biased shuttle plunger member which opens or closes fluid flow between an upstream and downstream side of the valve body responsive to a fluid pressure greater than the spring force and any differential pressure between the upstream and downstream side to prevent fluid from being supplied at a pressure higher than a desired operating pressure and prevent high dynamic differential pressures, such as a "water hammer" or explosive pressure.

2. Background Art

Fluid control valves of the on-off type that allow full fluid flow or completely shut off the fluid flow are well known in the art and are available in a wide range of various designs, sizes, pressure capabilities, and modes of operation. Such conventional valves are often identified by the configuration of the main valve components, such as the part that which opens and closes the fluid passage, and are commonly referred to as gate valves, butterfly valves, cock valves, globe valves, ball valves, poppet valves, shuttle valves and stem valves. As the working fluid pressure increases, the selection of suitable on-off valves decreases due to the difficulties in achieving fluid sealing and in operating the moving valve parts.

Typically, such valves capable of handling relatively high fluid differential pressures utilize a hardened valve stem, valve needle or valve poppet, usually of circular cross section, which is raised or lowered against a circular fluid passage commonly positioned at the center of a replaceable valve seat constructed of hardened metals. Conventional high-pressure on-off valves require a rotating motion, either manually or automatically, for raising or lowering a valve stem or valve needle. In many applications, such rotary motion is too slow and does not provide the required instant on-off action. In such case, the valve stem or valve needle must slide within the valve cavity to open or close the valve port.

Typically, the end of the valve stem which is exposed to the atmosphere is in contact with a source of force that imparts the sliding movement to the valve stem. Such force can be supplied by a human hand or by automatic or powered devices, such as with compressed air, pressurized hydraulic fluid, electricity or the like. Conventional solenoids, pneumatic or hydraulic actuators are also used to supply linear force to move the valve stem.

Check valves are also well-known and widely used in fluid systems of various types to permit fluid flow in one direction therethrough while preventing fluid flow in the opposite direction. Such check valves have a variety of different forms, principally ball check valves in which a spherical ball is held by a spring adjacent a seat until opened by fluid pressure overcoming the spring bias, and check valves having generally conical valve members operating in a similar manner as the ball check valve.

Dashner, U.S. Pat. No. 4,172,465 discloses a check valve having a semi-spherical valve member movable longitudinally in a generally tubular housing between a closed position engaging a conical valve seat and an open position spaced longitudinally therefrom, the valve member being slidably mounted for such movement on a longitudinally extending support element. The opening in the valve member which receives the support therein has a diameter significantly greater than the diameter of the support element whereby the valve member is pivotal thereon so as to seat properly on the valve seat. The center of the semi-spherical valve member is longitudinally spaced in one direction from the effective center of support thereof at the closed position of the valve member, and is longitudinally spaced in the opposite direction from the effective center of the valve member at the open position of the valve. The valve housing is specially formed to provide a flow path around the valve member which corresponds generally in area to the valve inlet and outlet openings to reduce the pressure loss of the fluid passing through the valve.

Muruyama et al, U.S. Pat. No. 5,271,430 discloses A flow rate control valve device for controlling and then supplying fluid under pressure to an actuator such as an hydraulic cylinder or the like which includes a valve body having a drain port kept at a low pressure and a main spool slidably mounted in the valve body to connect or disconnect the drain port with a pressure chamber. Notch grooves are formed on an outer peripheral surface of the main spool. A spring is interposed between the valve body and the main spool to urge the spool to a valve body seat. A pushing device is provided for pushing the main spool against the resilient force of the spring. A plate member is provided on the main spool in the drain port for causing pressurized flow through the notch grooves to flow first in a substantially radial direction of the main spool and subsequently into the drain port so part of the pressurized fluid impinges on the plate member for exerting a force urging the main spool in the direction disengaging the spool from the seat against a force of the spring and a flow force acting between the spool and the seat for at least canceling the flow force.

Tavor, U.S. Pat. No. 6,220,272 discloses in-line control valves which include a piston-type valve assembly and a plurality of control chambers controlled via one or more controls ports to provide a normally-open valve that may be closed by controlling the fluid pressure applied to the control port, or a normally-closed valve which may be opened by controlling the fluid pressure applied to the control port. Also described are valves which have a balanced construction and include relatively small actuators for opening and closing the valve.

Haeberer et al, U.S. Pat. No. 6,244,253 discloses a pressure control valve for a fuel injection apparatus for internal combustion engines, including a housing with a high-pressure connection and a return connection and including a cup-shaped piston, which is disposed in a housing bore, can be moved axially between a valve seat oriented toward the high-pressure connection and a stop oriented toward the return connection, counter to the spring force of a spring acting in the direction of the valve seat, and has at least one through opening that connects the inside of the cup-shaped piston to the housing bore, and is characterized in that at least one throttle element is disposed upstream and/or downstream of the valve seat in the flow direction of the fuel.

Kussel, U.S. Pat. No. 6,263,913 discloses a hydraulic multiway valve having a control piston, which is displaceable against the force of a spring by the plunger of a magnet from its closing position to its opening position. In the closing position, a pressure chamber with a pump connection is closed toward a consumer chamber, and the consumer chamber with a consumer is opened toward a return flow chamber and a reservoir connection. In the opening position, the consumer chamber is closed toward the return flow chamber. The consumer chamber and the return flow chamber are arranged at the opposite ends of the main piston, namely the consumer chamber on the side facing the magnet, and the return flow chamber on the side facing away therefrom. A central channel extends through the main piston and interconnects the consumer chamber and the return flow chamber. A magnet plunger acts upon a plunger piston, which is displaceable in the valve housing in coaxial relationship with the main piston, and which comprises a seat end facing the main piston, through which it closes the central channel, when it contacts the main piston.

The present invention is distinguished over the prior art in general, and these patents in particular by a fluid control valve having a spring biased plunger or shuttle member which opens or closes fluid flow through a plurality of radially spaced apart fluid passageways disposed between an upstream chamber and downstream chamber in the valve body responsive to a fluid pressure greater than the spring force and any differential pressure between the upstream and downstream chambers to prevent fluid from being supplied at a pressure higher than a desired operating pressure and prevent high dynamic differential pressures, such as a "water hammer" or explosive pressure. Alternatively, in a normally closed embodiment, pilot fluid at a pressure greater than the spring force and any differential pressure in the upstream chamber is utilized to open the valve.

SUMMARY OF THE INVENTION

It is therefore an object of the present invention to provide a fluid control valve that is relatively simple in construction, having few parts and particularly few moving parts.

It is another object of this invention to provide a fluid control valve that can serve functions other than simple on-off operations, such as pressure regulation in a fluid system.

Another object of this invention is to provide a fluid control valve wherein one or more seal rings on the plunger or shuttle form a fluid tight seal on the sealing surface in the valve body prior to surface-to-surface or metal-to-metal engagement to prevent jamming.

A further object of this invention is to provide a fluid control valve having one or more O-ring grooves on the plunger or shuttle configured to reduce the likelihood of the O-ring being swept out of the groove by a fast fluid flow or upon rapid opening of the shuttle.

A still further object of this invention is to provide a fluid control valve that is simple in construction, inexpensive to manufacture, and rugged and reliable in operation.

Other objects of the invention will become apparent from time to time throughout the specification and claims as hereinafter related.

The above noted objects and other objects of the invention are accomplished by a fluid control valve having a spring biased plunger or shuttle member which opens or closes fluid flow through a plurality of radially spaced apart fluid passageways disposed between an upstream chamber and downstream chamber in the valve body responsive to a fluid pressure greater than the spring force and any differential pressure between the upstream and downstream chambers to prevent fluid from being supplied at a pressure higher than a desired operating pressure and prevent high dynamic differential pressures, such as a "water hammer" or explosive pressure. Alternatively, in a normally closed embodiment, pilot fluid at a pressure greater than the spring force and any differential pressure in the upstream chamber is utilized to open the valve.

BRIEF DESCRIPTION OF THE DRAWINGS

FIG. 1 is a longitudinal cross section through a normally closed embodiment of the fluid control valve in accordance with the present invention, wherein the valve body and main body portion of the shuttle are tapered at an acute angle with respect to the longitudinal axis of the valve body to provide a conical sealing surface arrangement.

FIG. 1A is a transverse cross section through the valve assembly taken along line 1A—1A of FIG. 1.

FIG. 1B is a partial cross section of the sealing surface of the valve body of the embodiment of FIG. 1.

FIG. 2 is a partial cross sectional view showing an enlarged detail of an undercut wedge-shaped O-ring seal groove.

DESCRIPTION OF THE PREFERRED EMBODIMENT

Figure 3:
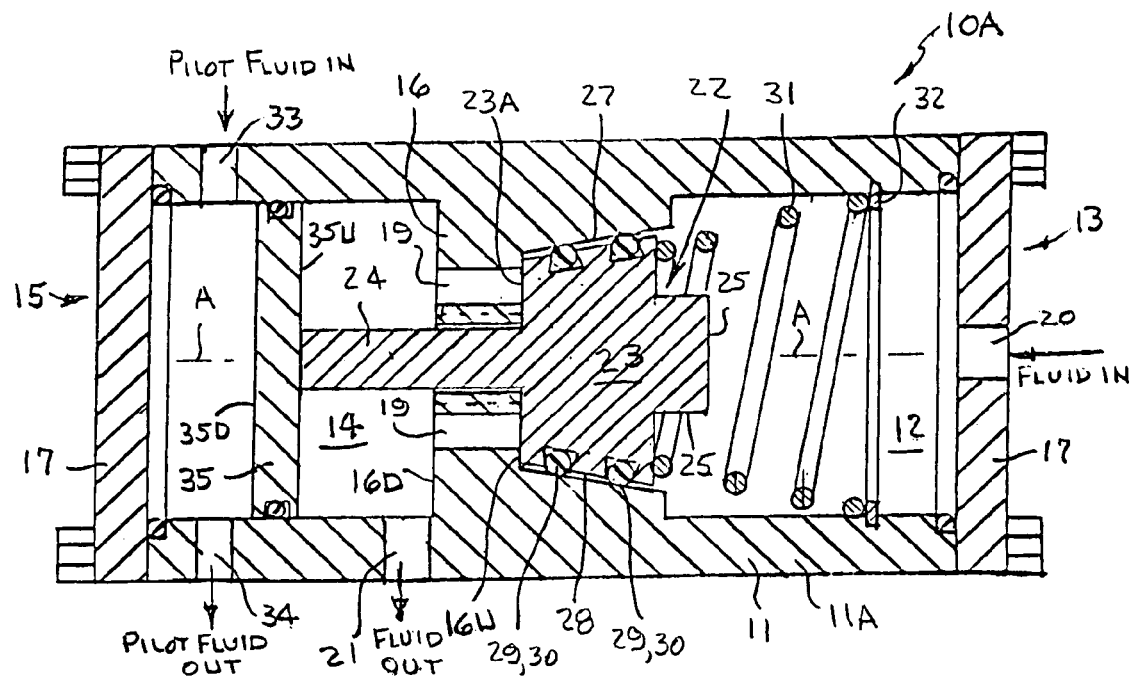
FIG. 3 is a longitudinal cross section through a first alternate embodiment of the normally closed fluid control valve in accordance with the present invention.

Referring to FIGS. 1, 1A and 1B of the drawings by numerals of reference, there is shown a preferred normally closed embodiment of the fluid control valve 10. The fluid control valve 10 includes a valve body 11 having a longitudinal axis A, a generally cylindrical upstream chamber 12 extending inwardly from an upstream end 13 and a generally cylindrical downstream chamber 14 extending inwardly from a downstream end 15. For purposes of illustration, the upstream end 13 is shown on the right-hand side of the valve body 11, and downstream end 15 is shown on the left-hand side. The body 11 has an interior wall 16 with an upstream side 16U and a downstream side 16D disposed perpendicular to the longitudinal axis A. The upstream chamber 12 terminates at the upstream side 16U of the interior wall 16, and the downstream chamber 14 terminates at the downstream side 16D. The upstream end of the upstream chamber 12 and the downstream end of the downstream chamber 14 are each sealingly enclosed by a respective end closure, such as an O-ring sealed end plate or flange 17 to allow easy disassembly and service of the valve. A reduced diameter central bore 18 extends through the interior wall 16 coaxial with the longitudinal axis A, and a plurality of fluid passageway bores 19 extend through the interior wall in circumferential radially spaced relation to the central bore.

The valve 10 is provided with at least one fluid inlet 20 in fluid communication with the upstream chamber 12, and at least one fluid outlet 19 in fluid communication with the downstream chamber 14. For purposes of example, in FIG.

1 the fluid inlet 20 and fluid outlet 21 are shown extending through the end flanges 17. However, it should be understood that the fluid inlet and outlets 20 and 21 may extend through the side wall 11A of the valve body 11. It should also be understood that the fluid inlet and outlets 20 and 21 may be threaded for receiving threaded fluid inlet and outlet pipe connections. Preferably, the fluid passageways 19 are of a sufficient number and are sized to provide a total cross-sectional flow area to equal to, or exceeding, the cross-sectional flow area of the inlet and outlet connections.

The valve assembly includes a shuttle member 22 having a main body portion 23 with a flat bottom surface 23A of sufficient diameter to engage the downstream side 16D of the interior wall 16 and cover the passageway bores 19, and a smaller diameter cylindrical stem portion 24 extending from the bottom surface and slidably through the central bore 18. In the normally closed embodiment of FIG. 1, the main body portion 23 of the shuttle 22 is disposed in the downstream chamber 14 and its stem portion 24 is slidably received in the central bore 18 facing the downstream end 15. A central reduced diameter boss 35 protrudes a short distance from the main body portion 23 opposite the stem portion 24.

As indicated in dashed line, the central bore 18 may be provided with in an oil-impregnated bearing 26 to reduce sliding friction of the shuttle stem 24. Alternatively, the surface of either of the central bore 18 or the shuttle stem 24 may be provided with circumferentially spaced teeth or splines to lower sliding friction, and the central bore may be provided with a wiper to inhibit entry of solids or grime.

The main body portion 23 of the shuttle 22 may be of several different configurations, each corresponding to a sealing surface configuration formed in the valve body as described hereinafter.

In the normally closed embodiment of FIG. 1, the downstream chamber 14 of the valve body 11 has a conical sealing surface 27 extending from the downstream side 16D of the interior wall 16 toward the downstream end 15 at an angle "B" with respect to the longitudinal axis A of the valve body, and the main body portion 23 of the shuttle 22 has a conical outer periphery 28 extending from its flat bottom surface 23A at substantially the same angle as the sealing surface 27.

In a preferred embodiment, the conical sealing surface 27 of the valve body and the main body portion 23 of the shuttle 22 are tapered at an acute angle of from about 2° to about 15° with respect to the longitudinal axis A of the valve body, however, the sealing angle may vary depending upon the end use of the valve, and may range anywhere between 0° to 90°, as described hereinafter.

At least one O-ring groove 29 is formed on the outer periphery 28 of the main body portion 23 of the shuttle 22, and an elastomeric seal ring is received in each ring groove. Two O-ring grooves 29 are shown in the illustrated example of the shuttle 22 having a conical outer periphery.

Referring additionally to FIG. 2, in a preferred embodiment, each seal ring groove 29 is a generally wedge-shaped circumferential groove, which in transverse cross section, has a flat bottom surface 29A and opposed converging sides 29B extending outwardly therefrom in opposed angular relation.

A compression spring 31 disposed in the downstream chamber 14 having one end surrounding the raised boss 25 is engaged on the main body portion 23 of the shuttle 22 and its opposed end is engaged on a snap ring 32 provided in the downstream chamber of the valve body 11. The O-ring seals 30 of the shuttle 22 are normally maintained in a sealing relation on the sealing surface 27 of the valve body by the spring force of the compression spring 31, thereby closing off fluid flow through the fluid passageways 19. Fluid flow from the upstream side 13 to the downstream side 15 must overcome the spring force, and any excess differential pressure on the downstream side of the shuttle. Backflow of fluid attempted from the downstream side 15 to the upstream side 13 only makes the seal tighter.

The angled sealing surface 27 of the valve body 11 and the angled outer periphery 28 of the main body portion 23 of the shuttle 22 are correlated such that in the closed position, the flat bottom surface 23A of the shuttle engages the downstream side 16D of the interior wall 16 and each seal ring 30 engages the sealing surface 27 and forms a fluid tight seal between the outer periphery of the shuttle and the sealing surface prior to surface-to-surface or metal-to-metal engagement of the outer periphery on the sealing surface to prevent jamming of the outer periphery on the sealing surface.

The shuttle 22 is maintained in a normally closed position with its flat bottom surface 23A engaged on the downstream side 16D of the interior wall 16 and covering the passageway bores 19 and its seal rings 30 preventing fluid flow of a pressure less than the spring force of the compression spring 31 and any differential pressure in the downstream chamber 14 through the fluid passageway bores between the upstream chamber 12 and the downstream chamber.

Fluid flow through the fluid inlet 21 into the upstream chamber 12 and the passageway bores 19 of a pressure exceeding the spring force and any differential pressure in the downstream chamber 14 impinges the flat bottom surface 23A of the shuttle 22 to move the main body portion 23 away from the downstream side 16D of the interior wall 16 to an open position, and flows through the fluid passageway bores 19, around the main body portion 23, into the downstream chamber 14, and exits through the fluid outlet 21.

Referring now to FIG. 3, there is shown a second embodiment 10A of the normally closed fluid control valve, wherein the sealing surface is in the upstream chamber and the valve is opened by a piston controlled by a pilot fluid. The components described previously are assigned the same numerals of reference, but their detailed description will not be repeated again to avoid repetition. As with the previously described embodiment, the upstream end of the upstream chamber 12 and the downstream end of the downstream chamber 14 are each sealingly enclosed by a respective end closure, such as an O-ring sealed end plate or flange 17 to allow easy disassembly and service of the valve. A reduced diameter central bore 18 extends through the interior wall 16 coaxial with the longitudinal axis A, and a plurality of fluid passageway bores 19 extend through the interior wall in circumferential radially spaced relation to the central bore.

In this embodiment, the valve 10A is provided with at least one fluid inlet 20 in fluid communication with the upstream chamber 12, and at least one fluid outlet 21 in fluid communication with the downstream chamber 14, and a pilot fluid inlet 33 and outlet 34 in fluid communication with the downstream chamber for introducing a pilot fluid thereinto. For purposes of example, in FIG. 3 the fluid outlet 21 and pilot fluid inlet and outlets 33 and 34 are shown extending through the side wall 11A of the valve body 11. It should be understood that the fluid inlet 20 and outlet 21 and pilot fluid inlet 33 and outlet 34 may be threaded for receiving threaded connections.

In the normally closed embodiment of FIG. 3, the main body portion 23 of the shuttle 22 is disposed in the upstream chamber 12 and its stem portion 24 is slidably received through the central bore 18 facing the downstream end 15, and a generally cylindrical piston member 35 is slidably and sealingly disposed in the downstream chamber 14. The piston member 35 has a downstream side 35D and an upstream side 35U disposed perpendicular to the longitudinal axis A of the valve body, and the piston member is movable between the pilot fluid inlet and outlets 33, 34 and the fluid outlet 21. The upstream side 35U of the piston member is connected with the downstream end of the stem 24 of the shuttle 22 to move therewith. In this embodiment, the flat bottom surface 23A of the shuttle 22 is configured to engage the upstream side 16U of the interior wall 16 and cover the passageway bores 19.

In the embodiment of FIG. 3, the upstream chamber 12 of the valve body 11 has a conical sealing surface 27 extending from the upstream side 16U of the interior wall 16 toward the upstream end 13 at an angle B with respect to the longitudinal axis A of the valve body, and the main body portion 23 of the shuttle 22 has a conical outer periphery 28 extending from its flat bottom surface 23A at substantially the same angle as the sealing surface.

A compression spring 31 disposed in the upstream chamber 12 having one end surrounding the raised boss 25 of the shuttle 22 is engaged on the main body portion 23 of the shuttle and its opposed end is engaged on a snap ring 32 provided in the upstream chamber of the valve body 11. The O-ring seals 30 of the shuttle 22 are normally maintained in a sealing relation on the sealing surface 27 of the valve body 11 by the spring force of the compression spring 31, thereby normally closing off fluid flow through the fluid passageways 19.

In this embodiment, pilot fluid (gas or liquid) at a pressure greater than the spring force of the spring 31 and any differential pressure in the upstream chamber 12 is introduced into the downstream chamber 14 between the enclosed end of the valve body and the downstream side 35D of the piston 35 to move the piston and the stem 24 of the shuttle 22 toward the downstream side 16D of the interior wall 16 and move the main body portion 23 of the shuttle away from the upstream side 16U of the interior wall 16 to an open position, whereby fluid flows through the fluid inlet 20 into the upstream chamber 12, around the main body portion 23, through the passageway bores 19 into the downstream chamber 14 between the interior wall downstream side 16D and the upstream side 35U of the piston, and exits through the fluid outlet 21. Upon releasing the pilot fluid pressure, the shuttle 22 is returned by the compression spring 31 to its normally closed position.

Figure 3A:
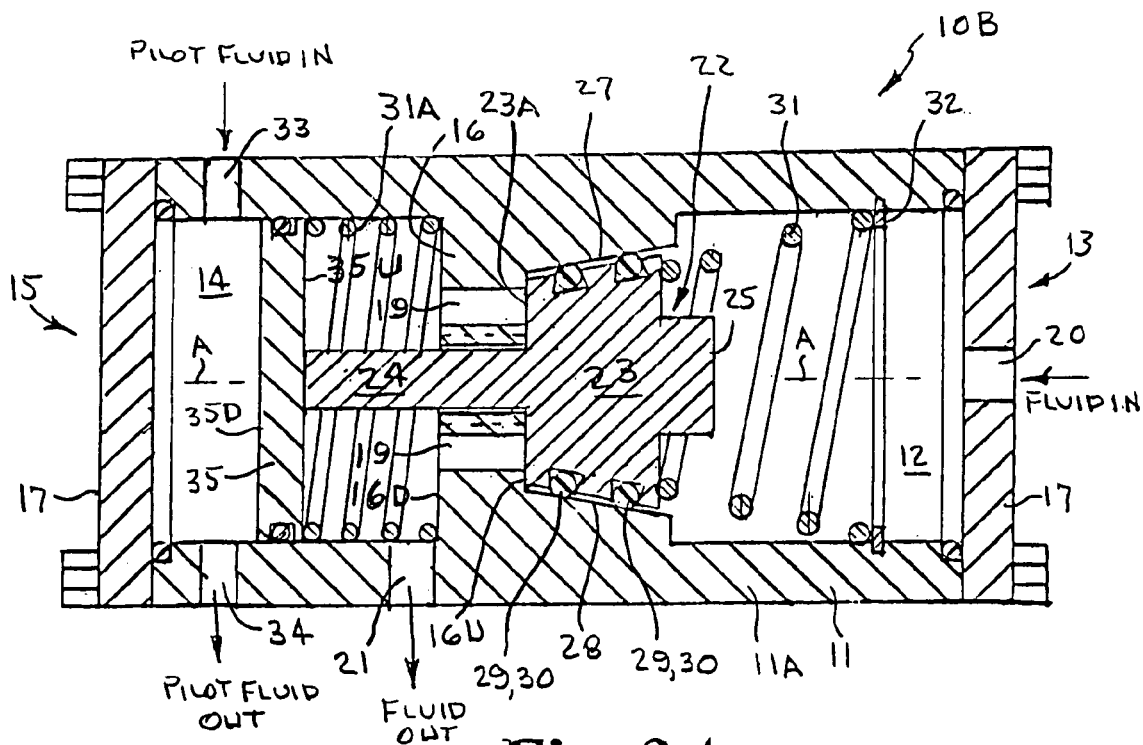
FIG. 3A is a longitudinal cross section through a second alternate embodiment of the normally closed fluid control valve having a secondary return spring arrangement.

Alternatively, as shown in FIG. 3A, a second compression spring 31A may be installed between the upstream side 35U of the piston 35 and downstream side 16D of the interior wall 16, in which case, pilot fluid at a pressure greater than the combined spring force and any differential pressure in the upstream chamber 12 is introduced into the downstream chamber 14 between the enclosed end of the valve body and the downstream side 13D of the piston 35 to move the piston and the stem 24 of the shuttle 22 toward the downstream side 16D of the interior wall 16 and move the main body portion 23 of the shuttle 22 away from the upstream side 16U of the interior wall to an open position, and upon releasing the pilot fluid pressure, the shuttle is returned by the compression springs 31, 31A to its normally closed position.

In the embodiments described above that incorporate a pilot fluid, the diameter of the piston 35 may be sized so as to allow movement by the same fluid pressure as the pressure of the fluid being controlled. Thus, in some installations, a portion of the fluid being controlled may be utilized as the pilot fluid.

Figure 4:
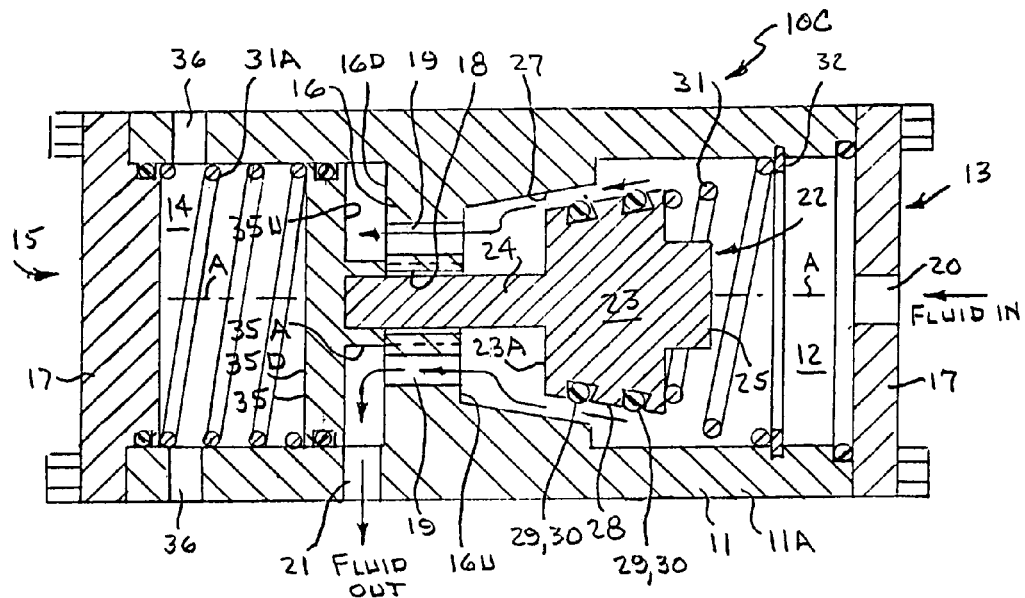
FIG. 4 is a longitudinal cross section through a normally open embodiment of the fluid control valve in accordance with the present invention.

Referring now to FIG. 4, there is shown a preferred normally open embodiment of the fluid control valve 10C. The components described previously are assigned the same numerals of reference, but their detailed description will not be repeated again to avoid repetition. As with the previously described embodiments, the upstream end of the upstream chamber 12 and the downstream end of the downstream chamber 14 are each sealingly enclosed by a respective end closure, such as an O-ring sealed end plate or flange 17 to allow easy disassembly and service of the valve. A reduced diameter central bore 18 extends through the interior wall 16 coaxial with the longitudinal axis A, and a plurality of fluid passageway bores 19 extend through the interior wall in circumferential radially spaced relation to the central bore.

In this embodiment, the valve 10C is provided with at least one fluid inlet 20 in fluid communication with the upstream chamber 12, and at least one fluid outlet 21 in fluid communication with the downstream chamber 14, and at least one vent port 36 in fluid communication with the downstream chamber for venting fluid pressure therefrom. For purposes of example, in FIG. 4 the fluid outlet 21 and vent port(s) 36 are shown extending through the side wall 11A of the valve body 11. It should be understood that the fluid inlet 20 and outlet 21 and the vent port(s) 36 may be threaded for receiving threaded connections.

In the normally open embodiment of FIG. 4, the main body portion 23 of the shuttle 22 is disposed in the upstream chamber 12 and its stem portion 24 is slidably received through the central bore 18 facing the downstream end 13, and a generally cylindrical piston member 35 is slidably and sealingly disposed in the downstream chamber 14. The piston member 35 has a downstream side 35D and an upstream side 35U disposed perpendicular to the longitudinal axis A of the valve body, and the piston member is movable between the vent port(s) 36 and the fluid outlet 21. The upstream side 35U of the piston 35 may be connected with, or free-floating to engage, the downstream end of the stem 24 of the shuttle 22 to move therewith, and has a reduced diameter stop surface 35A engageable with the downstream side 26D of the interior wall 16 radially inward of the fluid passageway bores 19 to prevent the piston from passing over or covering the fluid outlet 21.

In the embodiment of FIG. 4, the upstream chamber 12 of the valve body 11 has a conical sealing surface 27 extending from the upstream side 16U of the interior wall 16 toward the upstream end 13 at an angle B with respect to the longitudinal axis A of the valve body, and the main body portion 23 of the shuttle 22 has a conical outer periphery 28 extending from its flat bottom surface 23A at substantially the same angle as the sealing surface, and the flat bottom surface of the shuttle is configured to engage the upstream side 16U of the interior wall 16 and cover the passageway bores 19 when the valve is in a closed position.

A first compression spring 31 disposed in the upstream chamber 12 having one end surrounding the raised boss 25 of the shuttle 22 is engaged on the main body portion 23 of the shuttle and its opposed end is engaged on a snap ring 32 provided in the upstream chamber of the valve body 11.

A second compression spring 31A is disposed in the downstream chamber 14 and has one end engaged on the downstream end closure 17 and its opposed end engaged on the downstream side 35D of the piston 35 to normally urge the stop surface 35A of the piston into engagement with the downstream side 16D of the interior wall 16 with the flat bottom surface 23A of the shuttle 22 disposed a distance away from the fluid passageway bores 19. In this arrangement, the O-ring seals 30 of the shuttle 22 are normally maintained away from the sealing surface 27 of the valve body by the spring force of the second compression spring 31A, thereby allowing fluid flow through the fluid passageways 19.

In the normally open embodiment, the shuttle 22 is maintained by the second compression spring 31A in a normally open position with its flat bottom surface disposed a distance away from the interior wall 16 and passageway bores 19, and fluid of a pressure less than the spring force of the sprig 31A flows through the fluid inlet 20 into the upstream chamber 12, around the main body portion 23 of the shuttle 22, through the passageway bores 19 into the downstream chamber 14 between the interior wall 16 and the upstream side 35U of the piston 35, and exits through the fluid outlet 21. The first spring 31 maintains the shuttle 22 centered, and prevents wobbling.

Fluid at a pressure greater than the spring force of the spring 31A and any differential pressure in the downstream chamber 14 moves the shuttle member to a closed position with its flat bottom surface 23A engaged on the upstream side 16U of the interior wall 16 and covering the passageway bores 19 and the O-ring seals 30 in fluid sealing relation on the sealing surface 27 to prevent fluid flow through the fluid passageway bores into the downstream chamber 14. Upon the fluid pressure in the upstream chamber 12 falling below the spring force of the spring 31A, the shuttle 22 is returned by the compression spring 31A to its normally open position.

The sealing surface 27 of the valve body 11 and the main body portion 23 of the shuttle 22 have been shown and described in the embodiments above as being tapered at an acute angle, however, it should be understood that the sealing angle may range anywhere between 0° to 90°.

Figure 5:
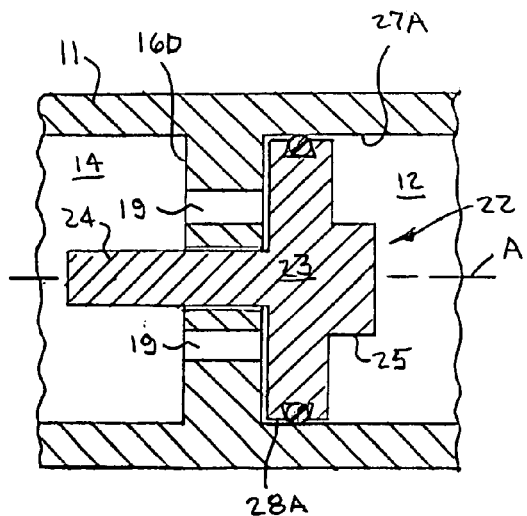
FIG. 5 is a partial longitudinal cross sectional view, showing somewhat schematically, a modification of the fluid control valve wherein the valve body and main body portion of the shuttle have sealing surface arrangement generally parallel to the longitudinal axis of the valve body.

For example, FIG. 5 shows, somewhat schematically, a valve sealing arrangement wherein either the upstream chamber 12 or downstream chamber 14 (depending upon whether the main body portion of the shuttle 22 is disposed in the upstream or downstream chamber) has a cylindrical sealing surface 27A extending from the interior wall 16 that is substantially parallel with the longitudinal axis A of the valve body 11, and the main body portion 23A of the shuttle 22 has a cylindrical outer periphery 28A extending from its flat bottom surface 23A; thus forming a sealing surface having approximately a 0° sealing angle with respect to the longitudinal axis.

Figure 6:
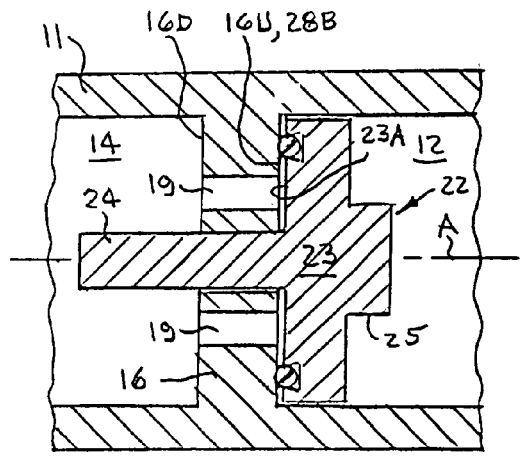
FIG. 6 is a partial longitudinal cross sectional view, showing somewhat schematically, another modification of the fluid control valve wherein the valve body and main body portion of the shuttle have sealing surface arrangement generally perpendicular to the longitudinal axis of the valve body.

FIG. 6 shows, somewhat schematically, a valve sealing arrangement wherein either the upstream side 16U or downstream side 16D of the interior wall 16 (depending upon whether the main body portion of the shuttle 22 is disposed in the upstream chamber 12 or downstream chamber 14) has a flat sealing surface 27B surrounding the fluid passageway bores 19 radially outward therefrom that is substantially perpendicular to the longitudinal axis A of the valve body 11, and the flat bottom surface 23A of the shuttle 22 has a seal ring groove 29 formed therein disposed radially outward from the fluid passageway bores 19 which receives an O-ring 30 to surround them when engaged on the sealing surface; thus forming approximately a 90° sealing angle with respect to the longitudinal axis.

The seal angle of the sealing surface depends upon the end use of the valve. When the angle is approximately a 90° sealing angle with respect to the longitudinal axis, (perpendicular) there would be no jamming of the shuttle, but the sealing properties may be reduced, particularly in instances where there is a low differential pressure across the seal. When the angle is approximately a 0° sealing angle with respect to the longitudinal axis (parallel), there is little possibility of jamming, but the seal life is reduced due to O-ring wear. When the seal angle is an angle less than 90°, but large there may be jamming, however, a good leakproof seal remains even with O-ring wear. When the seal angle is large enough to avoid jamming, the minimum differential pressure must be large enough to compress the O-ring(s). Thus, a preferred seal angle must strike a balance between the O-ring wear and the ability to seal at low differential pressures.

For the extreme case, where the valve is subject to very high differential pressure or very high dynamic differential pressure, as in a "water hammer" or explosive pressure, the seal angle should be great enough to provide good sealing at low differential pressure, over a range of O-ring wear, but small enough to prevent jamming. The wedge-shaped O-ring groove reduces the likelihood of the O-ring being swept out of the groove by a fast fluid flow.

The wedge-shaped O-ring groove 29 having tapered sides 29B that converge angularly inward and upward from the bottom 29A of the groove reduces the tendency for the O-ring 30 of the shuttle to be sucked out upon rapid opening of the shuttle. It should be understood, that the elastomeric O-ring seal element 30 may have a round or clover leaf transverse cross sectional configuration.

While this invention has been described fully and completely with special emphasis upon preferred embodiments, it should be understood that within the scope of the appended claims the invention may be practiced otherwise than as specifically described herein.

The invention claimed is:

1. A normally closed fluid control valve, comprising:
   a valve body having an upstream end and a downstream end, a generally cylindrical interior extending along a longitudinal axis, an interior wall disposed perpendicular to said longitudinal axis dividing said interior into a generally cylindrical upstream chamber extending inwardly from said upstream end and a generally cylindrical downstream chamber extending inwardly from said downstream end, said interior wall having an upstream side facing said upstream end and a downstream side facing said downstream end, said upstream chamber terminating at said upstream side and said downstream chamber terminating at said downstream side of said interior wall, an upstream end closure enclosing said upstream end, a downstream end closure enclosing said downstream end, a fluid inlet in fluid communication with said upstream chamber, and a fluid outlet in fluid communication with said downstream chamber;
   a conical sealing surface in said downstream chamber extending from said interior wall downstream side toward said downstream end at an acute angle with respect to said longitudinal axis;
   a reduced diameter central bore extending through said interior wall coaxial with said longitudinal axis, and a plurality of fluid passageway bores extending through said interior wall in circumferential radially spaced relation to said central bore, said fluid passageway bores being of sufficient quantity and sized to provide a total cross-sectional flow area to equal to, or exceeding, the cross-sectional flow area of said fluid inlet and said fluid outlet, respectively;
   a shuttle valve member having a main body portion disposed in said downstream chamber with a flat bottom surface of sufficient diameter to engage said interior wall downstream side and cover said passageway bores, a conical outer periphery extending from said flat bottom surface at substantially the same angle as said sealing surface, and a smaller diameter cylindrical stem portion extending from said bottom surface slidably received in said central bore;

at least one wedge-shaped seal ring groove in said shuttle valve conical outer periphery and an elastomeric seal ring in each said seal ring groove for preventing fluid flow through said fluid passageway bores when said shuttle valve member flat bottom surface is engaged on said interior wall; and a compression spring disposed in said downstream chamber engaged with said shuttle valve member main body portion to normally urge said flat bottom surface into engagement with said interior wall;

in assuming a normally closed position, said shuttle valve member flat bottom surface engages said downstream side of said interior wall and said seal ring engages said sealing surface and forms a fluid tight seal between said shuttle valve member outer periphery and said sealing surface prior to surface-to-surface engagement of said conical outer periphery on said conical sealing surface to prevent jamming of said outer periphery on said conical sealing surface;

said shuttle valve member is maintained by said spring in the normally closed position with its said flat bottom surface engaged on said interior wall downstream side and covering said passageway bores and each said seal ring preventing fluid flow of a pressure less than the spring force and any differential pressure in said downstream chamber through said fluid passageway bores between said upstream chamber and said downstream chamber; and fluid flow through said fluid inlet into said upstream chamber and said passageway bores of a pressure exceeding the spring force and any differential pressure in said downstream chamber impinges said shuttle member flat bottom surface to move said main body portion away from said interior wall downstream side to an open position, and flows through said fluid passageway bores around said main body portion into said downstream chamber and exits through said fluid outlet.

2. A normally closed fluid control valve, comprising:

a valve body having an upstream end and a downstream end, a generally cylindrical interior extending along a longitudinal axis, an interior wall disposed perpendicular to said longitudinal axis dividing said interior into a generally cylindrical upstream chamber extending inwardly from said upstream end and a generally cylindrical downstream chamber extending inwardly from said downstream end, said interior wall having an upstream side facing said upstream end and a downstream side facing said downstream end, said upstream chamber terminating at said upstream side and said downstream chamber terminating at said downstream side of said interior wall, an upstream end closure enclosing said upstream end, a downstream end closure enclosing said downstream end, a fluid inlet in fluid communication with said upstream chamber, and a fluid outlet in fluid communication with said downstream chamber;

a cylindrical sealing surface in said downstream chamber extending from said interior wall downstream side toward said downstream end substantially parallel with said longitudinal axis;

a reduced diameter central bore extending through said interior wall coaxial with said longitudinal axis, and a plurality of fluid passageway bores extending through said interior wall in circumferential radially spaced relation to said central bore, said fluid passageway bores being of sufficient quantity and sized to provide a total cross-sectional flow area to equal to, or exceeding, the cross-sectional flow area of said fluid inlet and said fluid outlet, respectively;

a shuttle valve member having a main body portion disposed in said downstream chamber with a flat bottom surface of sufficient diameter to engage said interior wall downstream side and cover said passageway bores, a cylindrical outer periphery extending from said flat bottom surface, and a smaller diameter cylindrical stem portion extending from said bottom surface slidably received in said central bore;

at least one wedge-shaped circumferential groove in said shuttle valve cylindrical outer periphery which, in transverse cross section, has a flat bottom surface and opposed converging sides extending outwardly therefrom in opposed angular relation and an elastomeric seal ring in each said seal ring groove for preventing fluid flow through said fluid passageway bores when said shuttle valve member flat bottom surface is engaged on said interior wall; and a compression spring disposed in said downstream chamber engaged with said shuttle valve member main body portion to normally urge said flat bottom surface into engagement with said interior wall;

said shuttle valve member maintained by said spring in a normally closed position with its said flat bottom surface engaged on said interior wall downstream side and covering said passageway bores and said seal ring engaged on said cylindrical sealing surface preventing fluid flow of a pressure less than the spring force and any differential pressure in said downstream chamber through said fluid passageway bores between said upstream chamber and said downstream chamber; and fluid flow through said fluid inlet into said upstream chamber and said passageway bores of a pressure exceeding the spring force and any differential pressure in said downstream chamber impinges said shuttle valve member flat bottom surface to move said main body portion away from said interior wall downstream side and said sealing surface to an open position, and flows through said fluid passageway bores around said main body portion into said downstream chamber and exits through said fluid outlet.

3. A normally closed fluid control valve, comprising:

a valve body having an upstream end and a downstream end, a generally cylindrical interior extending along a longitudinal axis, an interior wall disposed perpendicular to said longitudinal axis dividing said interior into a generally cylindrical upstream chamber extending inwardly from said upstream end and a generally cylindrical downstream chamber extending inwardly from said downstream end, said interior wall having an upstream side facing said upstream end and a downstream side facing said downstream end, said upstream chamber terminating at said upstream side and said downstream chamber terminating at said downstream side of said interior wall, an upstream end closure enclosing said upstream end, a downstream end closure enclosing said downstream end, a fluid inlet in fluid communication with said upstream chamber, and a fluid outlet in fluid communication with said downstream chamber;

a reduced diameter central bore extending through said interior wall coaxial with said longitudinal axis, and a plurality of fluid passageway bores extending through said interior wall in circumferential radially spaced relation to said central bore, said fluid passageway bores being of sufficient quantity and sized to provide a total cross-sectional flow area to equal to, or exceeding, the cross-sectional flow area of said fluid inlet and said fluid outlet, respectively;

a flat sealing surface on said interior wall downstream side surrounding said fluid passageway bores extending radially outward therefrom substantially perpendicular to said longitudinal axis;

a shuttle valve member having a main body portion disposed in said downstream chamber, a flat bottom surface of sufficient diameter to engage said flat sealing surface and cover said passageway bores and a smaller diameter cylindrical stem portion extending from said bottom surface slidably received in said central bore;

a generally wedge-shaped circular seal ring groove formed in said shuttle valve member flat bottom surface which, in transverse cross section, has a flat bottom surface and opposed converging sides extending outwardly therefrom in opposed angular relation, and an elastomeric seal ring in said seal ring groove disposed radially outward from said fluid passageway bores to surround same when engaged on said flat sealing surface;

a compression spring disposed in said downstream chamber engaged with said shuttle valve member main body portion to normally urge said seal ring into fluid sealing engagement with said flat sealing surface;

said shuttle valve member maintained by said spring in a normally closed position with its said flat bottom surface covering said passageway bores and said seal ring engaged on said flat sealing surface preventing fluid flow of a pressure less than the spring force and any differential pressure in said downstream chamber through said fluid passageway bores between said upstream chamber and said downstream chamber; and fluid flow through said fluid inlet into said upstream chamber and said passageway bores of a pressure exceeding the spring force and any differential pressure in said downstream chamber impinges said shuttle valve member flat bottom surface to move said main body portion away from said interior wall downstream side and said seal ring away from said sealing surface to an open position, and flows through said fluid passageway bores around said main body portion into said downstream chamber and exits through said fluid outlet.

* * * * *